US008380799B2

(12) United States Patent
Murthy et al.

(10) Patent No.: US 8,380,799 B2
(45) Date of Patent: Feb. 19, 2013

(54) TOPIC-BASED MESSAGING USING CONSUMER ADDRESS AND POOL

(75) Inventors: Sharad Murthy, Fremont, CA (US); Prasanna Krishna, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 337 days.

(21) Appl. No.: 12/761,248

(22) Filed: Apr. 15, 2010

(65) Prior Publication Data

US 2011/0258263 A1    Oct. 20, 2011

(51) Int. Cl.
G06F 15/16    (2006.01)

(52) U.S. Cl. ........ 709/206; 709/217; 709/223; 709/225; 709/230

(58) Field of Classification Search .......... 709/206, 709/217, 223, 225, 230
See application file for complete search history.

(56) References Cited

U.S. PATENT DOCUMENTS

| | | | |
|---|---|---|---|
| 5,432,792 A * | 7/1995 | Burkart et al. ............... | 370/385 |
| 6,529,950 B1 | 3/2003 | Lumelsky et al. | |
| 6,836,481 B1 * | 12/2004 | Hotta ............................ | 370/392 |
| 2004/0003097 A1 * | 1/2004 | Willis et al. ................... | 709/228 |
| 2004/0064431 A1 * | 4/2004 | Dorner et al. ................. | 707/1 |
| 2004/0088508 A1 * | 5/2004 | Ballard et al. ................. | 711/162 |
| 2006/0010449 A1 | 1/2006 | Flower et al. | |
| 2008/0025230 A1 | 1/2008 | Patel et al. | |
| 2008/0298397 A1 * | 12/2008 | Kwan et al. .................... | 370/477 |
| 2009/0296711 A1 | 12/2009 | Kennedy et al. | |

FOREIGN PATENT DOCUMENTS

WO    WO-0146817 A1    6/2001

OTHER PUBLICATIONS

"Instant Payment Notification Guide", *PayPal, Inc.*, IPN Guide—Document No. 10087.en_US-20090626, (Jun. 26, 2009), 60 pgs.
"Introducing IPN", *PayPal Integration Center, PayPal Inc.*, https://cms.paypal.com/us/cgi-bin/?cmd=_render-content&content_ID=developer/e_howto_admin_IPNIntro, (Oct. 4, 2009), 7 pgs.
"Steam Processing Platform for Multiplexing and Scrambling", *Harmonic ProStream 1000, DiviTrackMX—Highlights*, (Nov. 1, 2007), 4 pgs.
Jennings, Cath, "PayPal launches multi-pronged attack on e-crime", http://www.computerweekly.com/Articles/2008/03/17/229884/paypal-launches-multi-pronged-attack-on-e-crime.htm, ComputerWeekly.com, (Mar. 17, 2008), 2 pgs. Sharma, Praveen Kaushik, et al., "Managing end-to-end QoS in distributed embedded applications", *IEEE Internet Computing*, 10(3), http://www2.computer.org/portal/web/csdl/doi/10.1109/MIC.2006.58, (2006), 16-23.

* cited by examiner

*Primary Examiner* — Liangche A Wang
(74) *Attorney, Agent, or Firm* — Schwegman Lundberg & Woessner, P.A.

(57) ABSTRACT

In a multicast publisher-subscriber environment, a configurator machine manages a consumer pool of multiple receiver machines. The consumer pool is dedicated to a topic. Each receiver machine has a unique consumer address within the consumer pool allocated by the configurator machine. The configurator machine receives registration data from a receiver machine to be added to the consumer pool and provides a consumer address to the receiver machine. The receiver machine transmits a multicast communication to advertise its availability to receive messages on the topic. The multicast communication includes the consumer address. A transmitter machine may publish a message on the topic. The message may be a multicast communication directed to any receiver machine in to the consumer pool, or the message may be a point-to-point communication directed to the receiver machine with the consumer address.

20 Claims, 10 Drawing Sheets

US 8,380,799 B2

TOPIC-BASED MESSAGING USING CONSUMER ADDRESS AND POOL

TECHNICAL FIELD

The subject matter disclosed herein generally relates to the processing of data. Specifically, the present disclosure addresses systems and methods of topic-based messaging.

BACKGROUND

Communications between or among machines may be performed using a publisher-subscriber arrangement. A transmitter machine functions as a message publisher, also known as a message producer. The transmitter machine may transmit (e.g., produce or publish) one or more messages using a network. The transmitter machine sends a message via the network to one or more receiver machines. The message, however, is not addressed to any particular receiver machine. Rather, the transmitter machine sends the message using a multicast network protocol that allows multiple receiver machines to each receive the message. The multicast protocol supports one-to-many communication, and the transmitter machine has no information indicating which specific receiver machine will process the message. In this regard, the multicast communication differs from point-to-point (e.g., one-to-one) communication. A receiver machine functions as a message subscriber, also known as a message consumer. The receiver machine may receive (e.g., consume) the message sent from the transmitter machine. The receiver machine monitors the network for messages sent using the multicast protocol. This may be termed as "listening" or "subscribing" to such messages.

BRIEF DESCRIPTION OF THE DRAWINGS

Some embodiments are illustrated by way of example and not limitation in the figures of the accompanying drawings in which.

DETAILED DESCRIPTION

Figure 1:
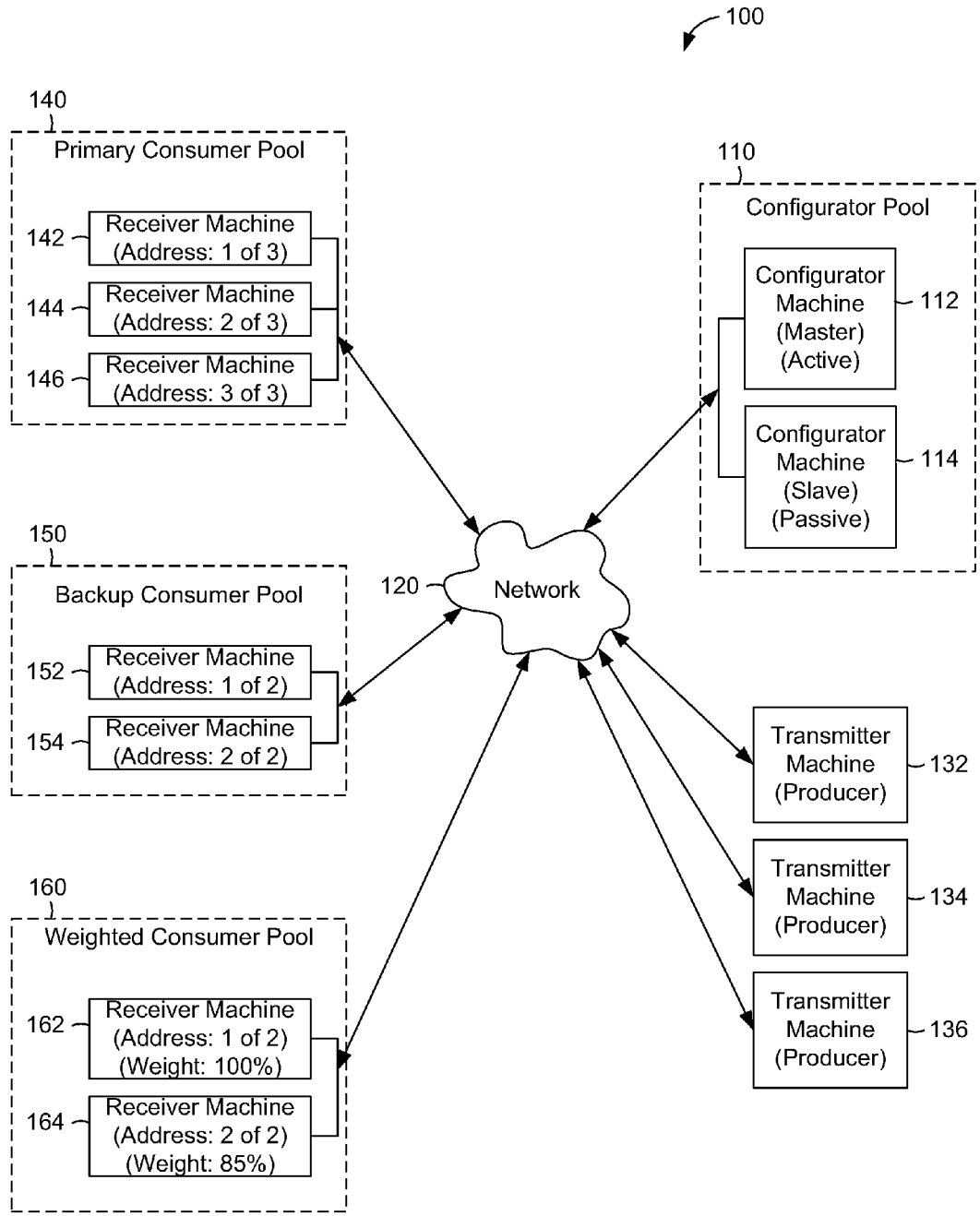
FIG. 1 is a network diagram illustrating a system including configurator machines, receiver machines, and transmitter machines, according to some example embodiments.

Example methods and systems are directed to topic-based messaging, including topic-based messaging using a consumer address in a consumer pool. Examples discussed herein merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A configurator machine functions as a network service manager to provide a topic-based messaging service. The topic-based messaging service allows a receiver machine to subscribe to messages of a specified topic and allows a transmitter machine to publish messages for that topic (e.g., a message on the topic). Accordingly, the receiver machine is also known as a subscriber machine or a consumer machine, and the transmitter machine is also known as a publisher machine or a producer machine. The receiver machine communicates with the configurator machine via a network and subscribes to the messages by registering a software process (e.g., a listener application or a subscriber application) with the configurator machine. The transmitter machine may communicate with the configurator machine, one or more receiver machines, or any suitable combination thereof, via the network and registers its own software process (e.g., a publisher application or a producer application) to publish messages on the topic.

The configurator machine manages a consumer pool of multiple receiver machines. The consumer pool is dedicated to the topic. Each receiver machine in the consumer pool has a unique consumer address within the consumer pool. The consumer pool may be visualized as an array (e.g., a one dimensional matrix) of receiver machines, where each receiver machine may occupy a unique position (e.g., a slot or a node) within the array. As such, the consumer pool may function as a team of consumer machines, where each consumer machine is a receiver machine allocated a particular position within the team. Accordingly, a receiver machine may also be known as a consumer machine. The configurator machine may expand or shrink the consumer pool by respectively adding or removing receiver machines and consumer addresses. As result, any number of receiver machines may be included within the consumer pool.

As noted above, the receiver machine subscribes to messages by registering a software process with the configurator machine. To add a receiver machine to the consumer pool, the configurator machine receives registration data from the receiver machine (e.g., sent by the receiver machine to register the software process). The registration data includes a topic identifier (e.g., a topic number or a topic name) and a network-based identifier of the receiver machine (e.g., an Internet protocol (IP) address). Based on the registration data, the configurator machine identifies the receiver machine as available for inclusion in the consumer pool. The configurator machine generates a consumer address and configuration data for the receiver machine, and provides both to the receiver machine. The configurator machine maintains a consumer pool registry that stores data describing the consumer pool, and the configurator machine accordingly updates the consumer pool registry with the consumer address and configuration data of the newly added receiver machine.

The receiver machine configures itself using the configuration data and generates a multicast communication (e.g., an advertisement message) that advertises the receiver machine as being available to receive messages for the topic. The receiver machine transmits this multicast communication (e.g., using a multicast protocol) via the network to all transmitter machines (e.g., all publisher machines) registered to publish messages for the topic.

In an example of topic-based messaging, a publisher machine may publish a message for the topic. The message may be directed to the consumer address of the receiver machine, or the message may be directed to no particular consumer address at all. In some situations, the publisher machine may transmit messages to the consumer pool generally (e.g., multicast, one-to-many communication). Such situations may arise to attain a specified level of network performance. In other situations (e.g., load balancing of messages or detection of fraudulent transactions), the publisher machine may transmit messages to a specific receiver machine in the consumer pool (e.g., unicast, point-to-point communication). Such latter situations may arise to ensure that the specific receiver machine processes all relevant messages within a series of messages on the topic.

The consumer pool may support one or more transport adaptors, and a receiver machine may request use of a particular transport adaptor (e.g., a multicast transport adaptor). As used herein, a transport adapter is a communication interface to translate from one communication protocol (e.g., an industry-standard protocol) to another communication protocol (e.g., a proprietary protocol). If the transport adaptor is available (e.g., supported by the message service), the configurator machine provides the receiver machine with a transport identifier for the requested transport adaptor. In some example embodiments, the topic corresponds to a particular transport adaptor (e.g., the name of the transport adaptor may be the topic identifier), and the receiver machine implicitly requests use of the particular transport adaptor by subscribing to the topic (e.g., by sending the registration data to the configurator machine). In such cases, the configurator machine need not provide an explicit transport identifier, and provision of the consumer address to the receiver machine may inherently authorize the receiver machine to use the particular transport adaptor.

As managed by the configurator machine, the consumer pool is fault-tolerant with respect to a loss of a receiver machine. If one receiver machine in the consumer pool becomes unavailable to process (e.g., receive) messages on the topic, the configurator machine identifies that receiver machine as being unavailable (e.g., detects that a status message has not been received within a period of time). The configurator machine identifies a replacement receiver machine for inclusion in the consumer pool and provides the consumer address (with appropriate configuration data) to the replacement receiver machine.

Moreover, the receiver machine may transmit a status message to the configurator machine, to one or more transmitter machines, or any suitable combination thereof (e.g., at regular periodic intervals or upon detection of an incipient problem). For example, the status message may indicate a buffer overflow, buffer underflow, or a buffer nearing overflow or underflow (e.g., transgressing a warning threshold). Based on the status message, the configurator machine, one or more transmitter machines, or any suitable combination thereof, may determine that the receiver machine is to receive messages at a reduced data rate (e.g., less than a maximum data rate of the receiver machine). In some example embodiments, the configurator machine provides (e.g., confirms) that reduced data rate to the receiver machine for inclusion in a further multicast communication (e.g., another advertisement message). Alternatively, one or more transmitter machines may provide (e.g., confirm) the reduced data rate. The receiver machine generates and transmits an updated multicast communication that includes the reduced data rate. Accordingly, one or more transmitter machines may receive and use this information in selecting a consumer address to receive messages.

The configurator machine itself may be part of a fault-tolerant pool of configurator machines, called a configurator pool. One configurator machine in the configurator pool is a master configurator machine and operates actively (e.g., managing the consumer pool). Other configurator machines in the configurator pool are slave configurator machines and operate passively (e.g., monitoring the consumer pool). Upon starting configurator services (e.g., after restarting or rebooting), each configurator machine detects whether a master configurator machine is managing the consumer pool. If no configurator machine is a master configurator machine, the slave configurator machines exchange vote messages with each other to determine which configurator machine is to become the new master configurator machine. Based on vote messages received, a particular configurator machine sends a message to the other configurator machines identifying itself as the new master configurator machine and begins managing the consumer pool. The remaining configurator machines then operate as slave configurator machines and begin monitoring the consumer pool.

In some example embodiments, topics may have subtopics, which in turn may have further subtopics. Accordingly, topics of messages may be structured using a hierarchy of any size or any level of sophistication. For example, the broadest topic may be a root topic that signifies a broad category of messages, and a particular message corresponding to the root topic may further correspond to a specific set of subtopics (e.g., node subtopics), including a leaf subtopic that signifies a very narrow category of messages.

Moreover, in publishing a message, the transmitter machine may address the message to a particular consumer address for processing by a particular receiver machine. As an example, the transmitter machine may include the consumer address and a size of the consumer pool in the message. As another example, the transmitter machine may include a hash generated based on the consumer address and the size of the consumer pool. The receiver machine, upon receiving the message, parses the hash and compares it to its own configuration data (e.g., sent from the configurator machine). The receiver machine may process the message based on the comparison. As further example, the transmitter machine may compute one hash for a message (e.g., received from an upstream device) and compute another hash based on the consumer address and the size of the consumer pool. If the two hashes match, the transmitter machine publishes the message as a point-to-point message addressed to the particular consumer address.

Furthermore, the messages themselves may indicate occurrences of events pertinent to a topic of the messages (e.g., the root topic, one or more node subtopics, or a leaf subtopic). For example, the root topic may be "online shopping"; the leaf subtopic may be "credit card number 12345"; and each message published for the leaf topic may be a transaction record involving this particular credit card. The consumer pool may be dedicated to receiving messages for the root topic ("online shopping"), with messages for the leaf subtopic ("credit card number 12345") all being addressed to the same consumer address within the consumer pool (e.g., address "1 of 3"). In this arrangement, messages pertaining to the events that involve this particular credit card may be processed (e.g., monitored) by a single receiver machine within a scalable pool (e.g., the consumer pool) of receiver machines. This has the effect of enabling some messages for "online shopping" to be processed using multiple receiver machines, while allowing specified other messages on the same root topic to be processed using a single receiver machine. Accordingly, by advertising its consumer address to message publishers, the receiver machine may indicate an availability to receive point-to-point communications, even in a multicast publisher-subscriber environment. In some example embodiments, this capability is used to facilitate detection of fraudulent transactions (e.g., multiple credit card charges sent from different stores within a short period of time).

FIG. 1 is a network diagram illustrating a system 100, according to some example embodiments. The system 100 includes configurator machines 112-114, receiver machines 142-146, 152-154, and 162-164, and transmitter machines 132-136, all coupled to each other via a network 120.

Receiver machines 142-146 are included in a primary consumer pool 140. Within the primary consumer pool 140, each of the receiver machines 142-146 has a unique consumer address. One receiver machine 142 has the address "1 of 3." Another receiver machine 142 has the address "2 of 3." A further receiver machine 146 has the address "3 of 3."

A consumer address may be any data that is unique within the relevant consumer pool (e.g., primary consumer pool 140). For example, a consumer address may be a number, an alphanumeric string, an encrypted key, or any suitable combination thereof. Moreover, the consumer address may include a total number of receiver machines in the relevant consumer pool (e.g., "1 of 3"). This effectively communicates to one or more publisher machines (e.g., transmitter machine 132) the size of the relevant consumer pool.

Receiver machines 152-154 are included in a backup consumer pool 150. In the backup consumer pool 150, each of the receiver machines 152-154 has a unique consumer address. One receiver machine 152 has the address "1 of 2," and the other receiver machine 154 has the address "2 of 2."

Receiver machines 162-164 are included in a weighted consumer pool 160, where the receiver machines 162 and 164 respectively are addressed "1 of 2" and "2 of 2." Additionally, one receiver machine 162 has a weight of 100%, signifying that the receiver machine 162 can accept messages at its maximum data rate. The other receiver machine 164 has a weight of 85%, signifying that the receiver machine 164 can accept messages at a reduced data rate equivalent to 85% of its maximum data rate. A data rate may be expressed as an amount of data (e.g., bits, bytes, packets, etc.) processed within a period of time, a number of messages (e.g., messages on the topic) processed within a period of time, a number of transactions (e.g., financial transactions indicated by messages on the topic) processed within a period of time, or any suitable combination thereof.

The primary consumer pool 140 is dedicated to a particular topic (e.g., a root topic) and processes messages pertaining to the topic as the messages are published by the transmitter machines 132-136. The backup consumer pool 150 is available to process the messages in the event that the primary consumer pool 140 becomes unavailable (e.g., due to a problem with the network 120).

The weighted consumer pool 160 is shown in FIG. 1 to illustrate a weighted configuration for a consumer pool. Each of the receiver machines 162-164 in the weighted consumer pool 160 may be configured by the configurator machine 112 to receive messages at a reduced data rate. In some example embodiments, the reduced data rate is a percentage of a maximum data rate available in the weighted consumer pool 160 (e.g., the maximum data rate of the fastest receiver machine in the pool).

Configurator machines 112-114 are included in a configurator pool 110. In the configurator pool 110, one configurator machine 112 is a master configurator machine that actively manages the primary consumer pool 140, the backup consumer pool 150, and the weighted consumer pool 160. The other configurator machine 114 is a slave configurator machine that passively monitors the three consumer pools 140, 150, and 160.

Any of the machines shown in FIG. 1 may be implemented in a general-purpose computer modified (e.g., programmed) by software to be a special-purpose computer to perform the functions described herein for that machine. For example, a computer system able to implement any one or more of the methodologies described herein is discussed below with respect to FIG. 7. Moreover, any two or more of the machines illustrated in FIG. 1 may be combined into a single machine, and the functions described herein for any single machine may be subdivided among multiple machines.

The network 120 may be any network that enables communication between machines (e.g., receiver machine 142 and configurator machine 112). Accordingly, the network 120 may be a wired network, a wireless network, or any suitable combination thereof. The network 120 may include one or more portions that constitute a private network, a public network (e.g., the Internet), or any suitable combination thereof.

Figure 2:
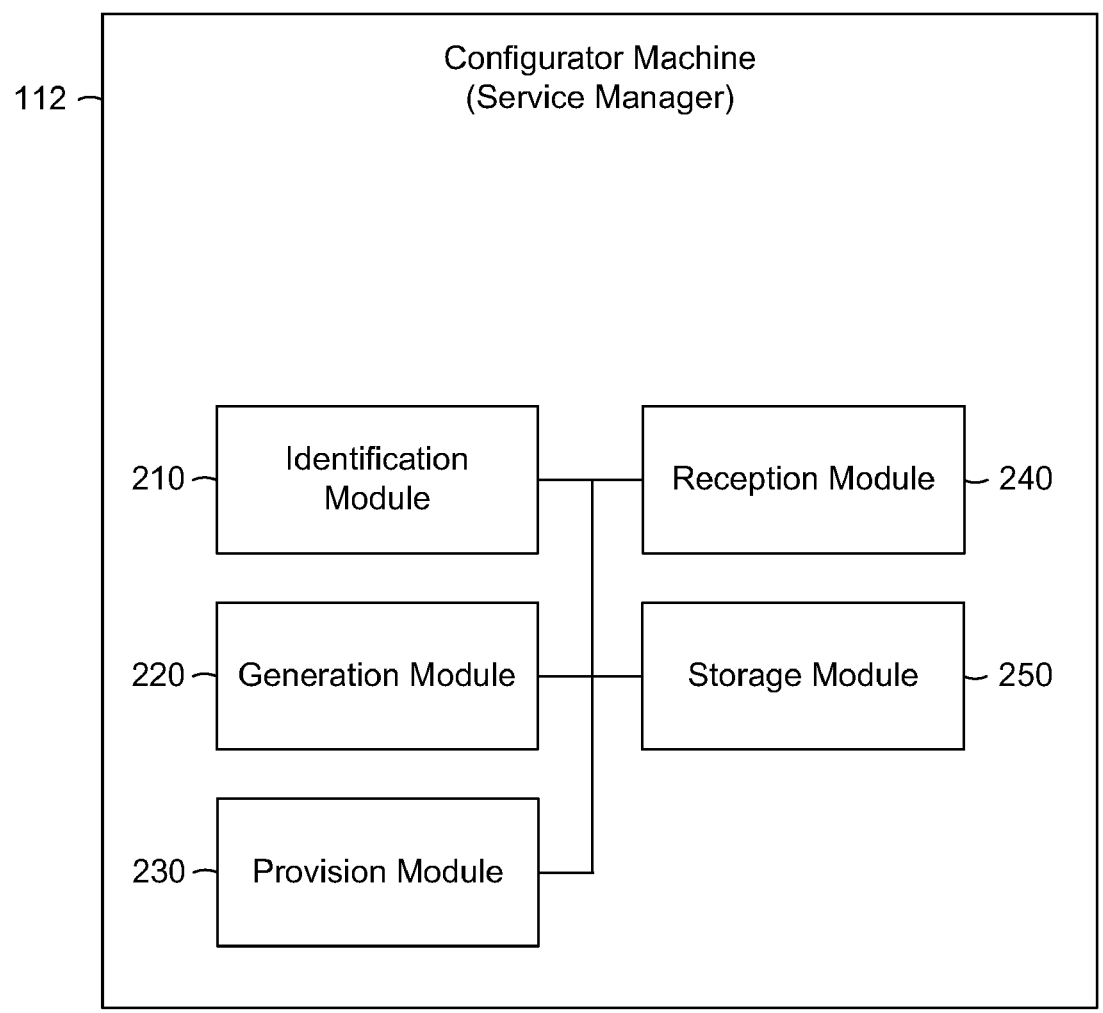
FIG. 2 is a block diagram of a configurator machine, according to some example embodiments.

FIG. 2 is a block diagram of a configurator machine 112, according to some example embodiments. The configurator machine 112 includes an identification module 210, a generation module 220, a provision module 230, a reception module 240, and a storage module 250, all configured to communicate with each other (e.g., via a bus, a shared memory, or a switch). Any of these modules may be implemented using hardware or a combination of hardware and software. Moreover, any two or more of these modules may be combined into a single module, and the functions described herein for a single module may be subdivided among multiple modules.

The reception module 240 of the configurator machine 112 is configured to receive registration data from the receiver machine 142. The registration data indicates that the receiver machine 142 is available to receive one or more messages that correspond to a topic. The registration data may include a network-based identifier (e.g., an IP address or hostname) of the receiver machine 142. The reception module 240 is further configured to receive publication data from a transmitter machine 132. The publication data indicates that the transmitter machine 132 is to transmit one or more messages that correspond to the topic.

The reception module 240 is also configured to receive a status message from the receiver machine 142. For example, the status message may indicate that the receiver machine 142 is to receive messages at a reduced data rate. The reduced data rate may be a percentage of a maximum data rate of the receiver machine 142. In certain example embodiments, the reduced data rate may be a percentage of a maximum data rate of another receiver machine (e.g., receiver machine 144) in the primary consumer pool 140. As an example, the fastest receiver machine (e.g., receiver machine 144) in the primary consumer pool 140 may support a maximum data rate of 10 Mbps. The reduced data rate of the receiver machine 142 may be expressed as a percentage of 10 Mbps.

The topic-based messaging service may support multiple transport adaptors to facilitate communication between publishers and subscribers using multiple transport protocols.

The reception module 240 may receive a request from the receiver machine 142 to use a particular transport adaptor. For example, the transmitter machine 132 may be publishing messages using a particular transport protocol, and the receiver machine 142 may send a request to the configurator machine 112 to use a transport adaptor corresponding to that transport protocol. The reception module 240 receives this request. According to various example embodiments, the transport adaptor is configured to use a multicast protocol, User Datagram Protocol (UDP), a negative-acknowledge protocol (NAK), Transmission Control Article (TCP), or any suitable combination thereof. As published by the transmitter machine 132, one or more messages may include a transport identifier that identifies the transport adaptor (e.g., as selected by the transmitter machine 132 in publishing the message).

The identification module 210 of the configurator machine 112 is configured to identify a receiver machine 142 as being available for inclusion in the primary consumer pool 140, which is dedicated to the topic. The identification module 210 may (e.g., at some later time) identify the receiver machine 142 as being unavailable to process messages for the topic. For example, the receiver machine 142 may have crashed or otherwise shut down. When this occurs, the identification module 210 may identify another receiver machine 162 as being available to replace the now-unavailable receiver machine 142 in the primary consumer pool 140. The identified replacement receiver machine (e.g., receiver machine 162) may be any receiver machine accessible by the configurator machine 112. Furthermore, the identification module 210 may identify the configurator machine 112 as a master configurator machine or as a slave configurator machine based on vote messages received from one or more other configurator machines (e.g., configurator machine 114).

The generation module 220 of the configurator machine 112 is configured to generate a consumer address of the receiver machine 142 with respect to the primary consumer pool 140. As noted above, the consumer address is unique within the primary consumer pool 140. The generation module 220 generates the consumer address based on registration data received from the receiver machine 142. The generation module 220 is further configured to generate configuration data for the receiver machine 142. The configuration data may be generated based on the network-based identifier (e.g., IP address or hostname) of the receiver machine 142.

The provision module 230 of the configurator machine 112 is configured to provide the consumer address to the receiver machine 142. The consumer address is usable by the receiver machine 142 to generate a multicast communication based on the consumer address. The multicast communication indicates that the receiver machine 142 is available to receive one or more messages that correspond to the topic of the primary consumer pool 140. The provision module 230 is further configured to provide the configuration data to the receiver machine 142. Furthermore, the provision module 230 is also configured to determine that a transport adaptor is available for use by the receiver machine 142, as well as to provide the corresponding transport identifier for that transport adaptor to the receiver machine 142.

Where the reception module 240 of the configurator machine 112 has received a status message indicating that the receiver machine 142 is to receive messages at a reduced data rate, the provision module 230 determines the reduced data rate (e.g., 85% of 10 Mbps or 75% of 10 transactions per second (TPS)) and provides the reduced data rate to the receiver machine 142.

The storage module 250 of the configurator machine 112 is configured to store pool data corresponding to the primary consumer pool 140. The pool data may be a database (e.g., a registry, a record, a table, or a file) that stores a current status of the primary consumer pool 140. The pool data includes a reference to each receiver machine (e.g., receiver machine 144) in the primary consumer pool 140 as well as its consumer address within the primary consumer pool 140. The storage module 250 is further configured to update the pool data by including (e.g., adding) a reference to the receiver machine 142 and the consumer address of the receiver machine 142 to the pool data for the primary consumer pool 140. Similarly, the storage module 250 may remove the reference and the consumer address when deleting the receiver machine 142 from the primary consumer pool 140.

Figure 3:
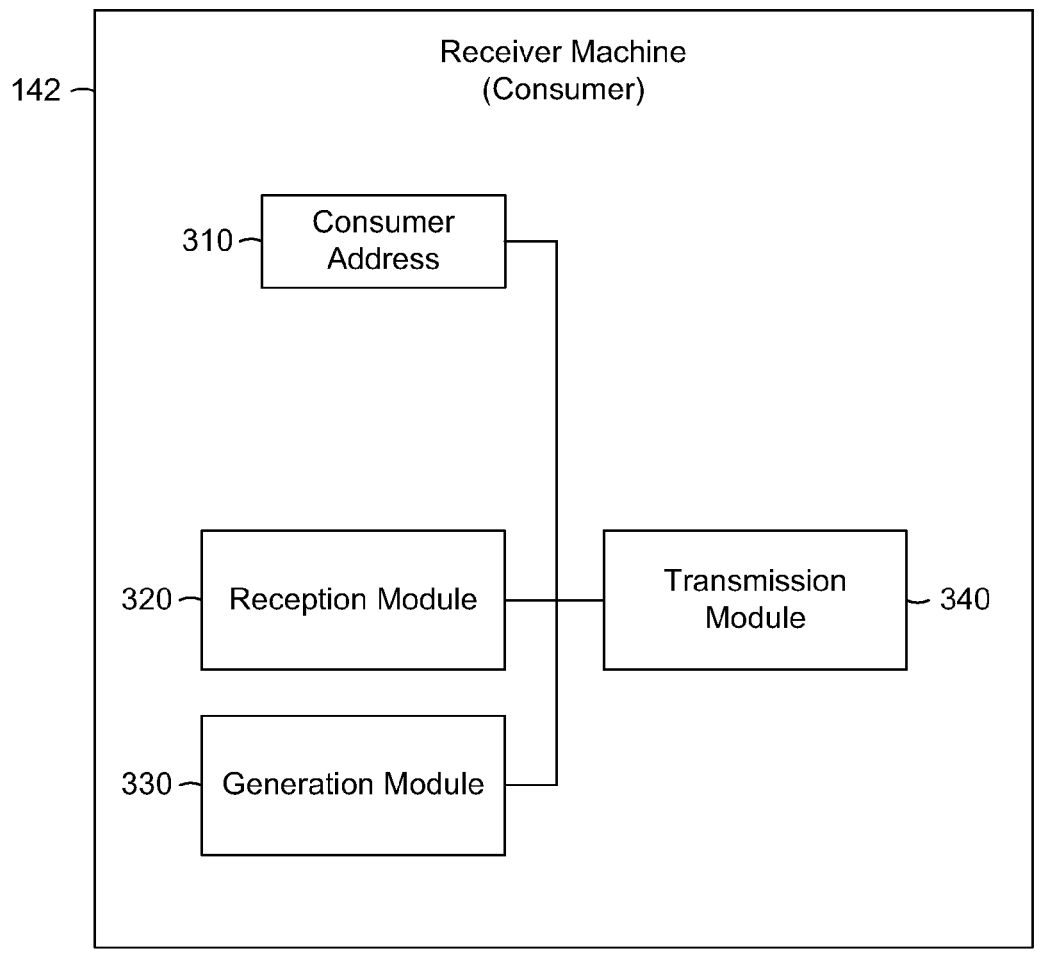
FIG. 3 is a block diagram of a receiver machine, according to some example embodiments.

FIG. 3 is a block diagram of a receiver machine 142, according to some example embodiments. The receiver machine 142 includes a reception module 320, a generation module 330, and a transmission module 340. In addition, the receiver machine 142 may store (e.g., in a memory) a consumer address 310 received from the configurator machine 112.

The reception module 320 of the receiver machine 142 is configured to receive the consumer address 310 from the configurator machine 112. The reception module 320 is further configured to receive the configuration data generated by the configurator machine 112. Reception of the consumer address 310 and the configuration data may occur in a single communication from the configurator machine 112. Moreover, the reception module 320 is also configured to receive one or more messages on the topic corresponding to the primary consumer pool 140.

The generation module 330 of the receiver machine 142 is configured to generate a multicast communication that indicates the receiver machine as being available to receive one or more messages that correspond to the topic of the primary consumer pool 140. For example, the multicast communication may be a multicast advertisement message that advertises the receiver machine 142 to one or more transmitter machines (e.g., transmitter machine 132) accessible via the network 120. The generation module 330 may generate the multicast communication based on the consumer address 310, the configuration data received from the configurator machine 112, or any suitable combination thereof. The multicast communication may include the network-based identifier (e.g., IP address or hostname) of the receiver machine 140. Furthermore, the multicast communication may indicate (e.g., by the presence of the consumer address 310) that the receiver machine 142 is available for point-to-point communication with one or more transmitter machines (e.g., transmitter machine 132).

The transmission module 340 of the receiver machine 142 is configured to transmit the multicast communication via the network 120. The transmission module 240 is further configured to transmit registration data to the configurator machine 112. The registration data is used to register a software application (e.g., a listener application) with the topic-based messaging service, as managed by the configurator machine 112. As such, the registration data may include a topic identifier that identifies the topic corresponding to the primary consumer pool 140. As noted above, the registration data may include the network-based identifier of the receiver machine 142. In addition, the transmission module 340 is also configured to transmit one or more status messages to the configurator machine 112. A status message may include a request to pause reception of messages. Similarly, a status message may include a request to resume reception of messages (e.g., where message reception has been previously paused). As noted above, a status message may indicate that the receiver machine 140 to is to receive messages at a reduced data rate compared to a maximum data rate.

Figure 4:
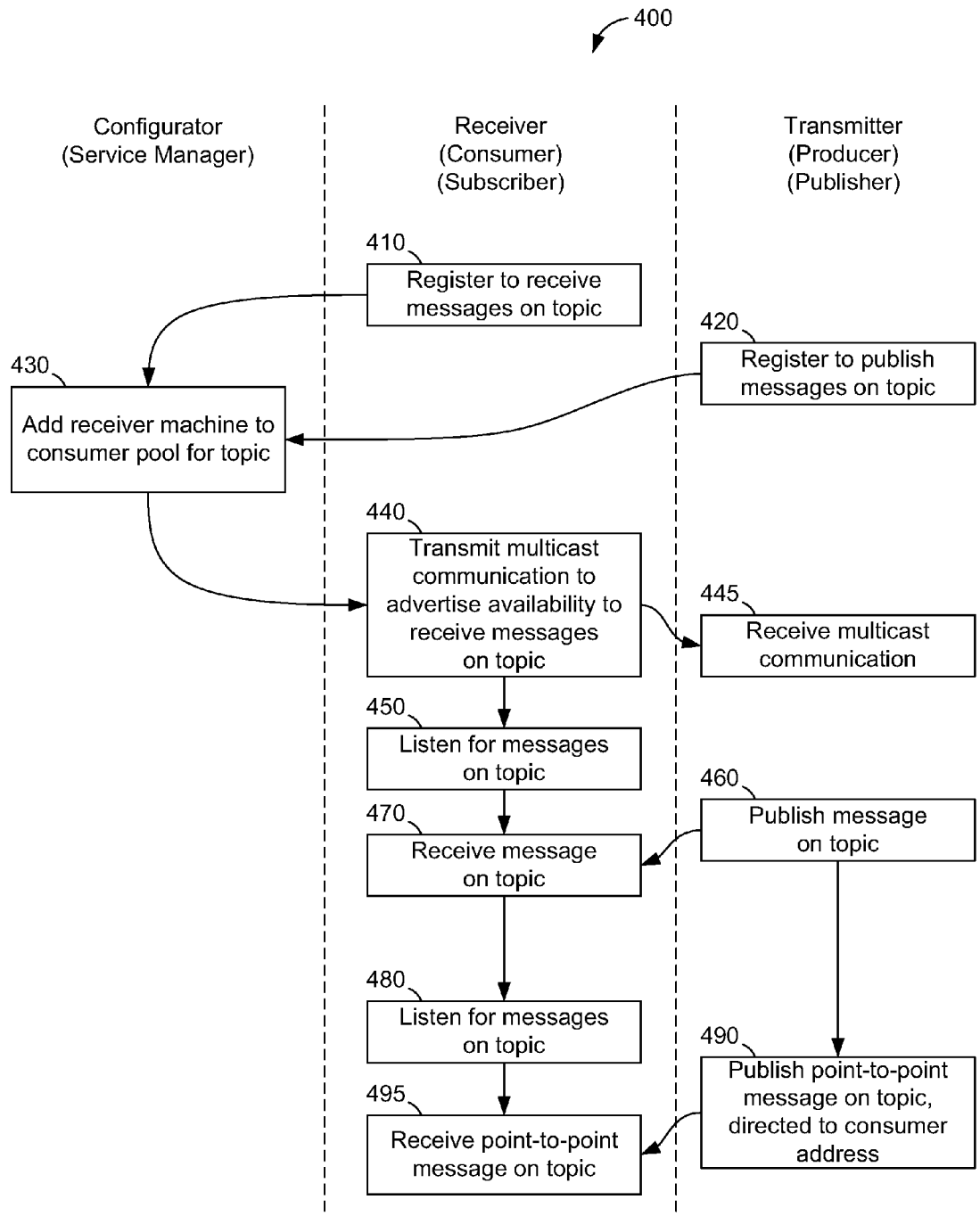
FIG. 4-5 are flowcharts illustrating operations in a method of topic-based messaging using a consumer address in a consumer pool, according to some example embodiments.
Figure 5:
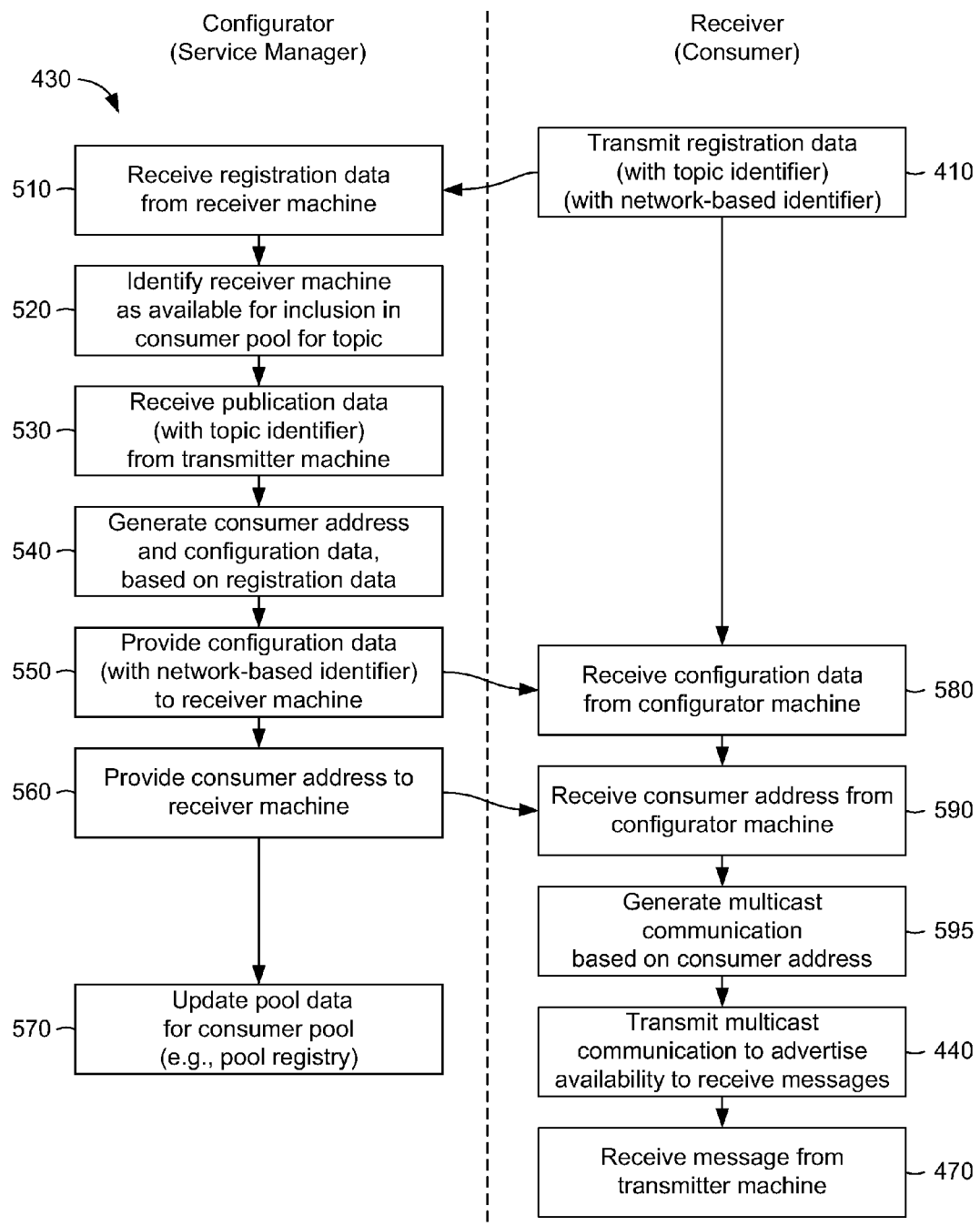

FIG. 4-5 are flowcharts illustrating operations in a method 400 of topic-based messaging using the consumer address 310 with respect to the primary consumer pool 140, according to some example embodiments. The method 400 includes operations 410-490 and 510-595.

In operation 410, the receiver machine 142 registers a software application to receive messages on the topic corresponding to the primary consumer pool 140. As noted above, the transmission module 340 of the receiver machine 142 transmits registration data to the configurator machine 112. Operation 410 includes transmitting the registration data, which may include a topic identifier that specifies the topic, a network-based identifier of the receiver machine 142, or both.

In operation 420, the transmitter machine 132 registers a software application to publish messages on the topic. As an example, the transmitter machine 132 may send publication data to the configurator machine 112, thus indicating that the transmitter machine 132 is to publish one or more messages on the topic. As another example, the transmitter machine 132 may send the publication data to one or more receiver machines (e.g., receiver machines 142-146 and 152-154), thus indicating to the receiver machines that the transmitter machine 132 is to publish one or more messages on the topic. The publication data includes the topic identifier.

In operation 430, the configurator machine 112 adds the receiver machine 142 to the primary consumer pool 140, which is dedicated to the topic. Operation 430 includes operations 510-560, which are performed by the configurator machine 112.

Referring now to FIG. 5, in operation 510, the reception module 240 of the configurator machine 112 receives the registration data from the receiver machine 142. In operation 520, the identification module 210 of the configurator machine 112 identifies the receiver machine 142 as being available for inclusion in the primary consumer pool 140. In operation 530, the reception module 240 of the configurator machine 112 receives the publication data from the transmitter machine 132.

In operation 540, the generation module 220 generates the consumer address 310 and the configuration data for the receiver machine 142, based on the registration data received from the receiver machine 142. Generation of the consumer address may include identifying the primary consumer pool 140 using the topic identifier, accessing pool data for the primary consumer pool 140 (e.g., as maintained by the configurator machine 112), and identifying a consumer address (e.g., consumer address 310) as being unallocated within the primary consumer pool 140. Generation of the configuration data is based on the network-based identifier received from the receiver machine 142, and the configuration data may include the network-based identifier.

In operation 550, the provision module 230 of the configurator machine 112 provides the configuration data to the receiver machine 142. Subsequently, in operation 560, the provision module 230 provides the consumer address 310 to the receiver machine 142. Operations 550-560 may be performed using a single communication to the receiver machine 142. For example, the single communication may include the network-based identifier and the consumer address 310.

In operations 580-590, the reception module 320 of the receiver machine 142 respectively receives the configuration data and the consumer address 310. For example, the reception module 320 may receive a single communication containing the network-based identifier and the consumer address 310. Upon detection of the network-based identifier, the reception module 220 may store the consumer address 310 at the receiver machine 142 (e.g., in a memory).

In operation 595, the generation module 330 of the receiver machine 142 generates a multicast communication based on the consumer address 310. As noted above, the multicast communication is a multicast advertisement message that indicates an availability of the receiver machine 142 to receive messages on the topic.

In operation 570, the configurator machine 112 updates the pool data for the primary consumer pool 140 to reflect that the receiver machine 142 has been added to the primary consumer pool 140. Operation 570 may involve storing a reference to the receiver machine 142 (e.g., the network-based identifier of the receiver machine 142) with the consumer address 310 of the receiver machine 142. The reference and the consumer address 310 may be stored in the pool data by the storage module 250 of the configurator machine 112.

Returning to FIG. 4, in operation 440, the transmission module 340 of the receiver machine 142 transmits the multicast communication, thus advertising to the transmitter machines 132-136 that the receiver machine 142 has been added to the primary consumer pool 140 and is accordingly available to receive messages on the topic. In operation 445, a transmitter machine (e.g., transmitter machine 132) receives the multicast communication for use in publishing messages on the topic.

Operations 450-470 illustrate an example of multicast communication using the topic-based messaging service. In operation 450, the registered software application executing at the receiver machine 142 monitors the network 120 (e.g., listens) for messages on the topic. In operation 460, the transmitter machine 132 publishes a message on the topic. The message is a multicast message directed to the primary consumer pool 140, but not directed to any particular consumer address (e.g., consumer address 310). In operation 470, the reception module 320 of the receiver machine 142 may receive this message for processing by the receiver machine 142.

Operations 480-495 illustrate an example of point-to-point communication using the topic-based messaging service. In operation 480, the registered software application again monitors the network 120 for messages on the topic. In operation 490, the transmitter machine 132 publishes a further message on the topic. This further message is a point-to-point message that is directed to the primary consumer pool 140 and also directed to the consumer address 310 of the receiver machine 142. In operation 495, the reception module 320 of the receiver machine 142 receives the further message as a point-to-point communication from the transmitter machine 132.

Figure 6:
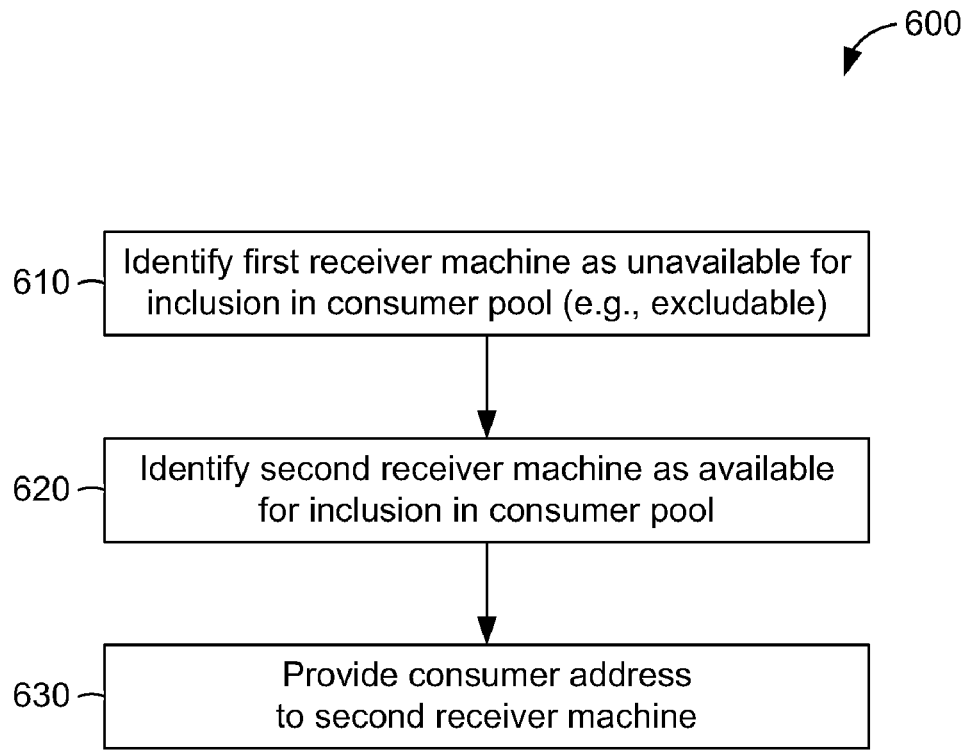
FIG. 6 is a flow chart illustrating operations in a method of replacing one receiver machine with another receiver machine in a consumer pool, according to some example embodiments.

FIG. 6 is a flow chart illustrating operations in method 600 of replacing one receiver machine 142 with another receiver machine (e.g., receiver machine 164) in the primary consumer pool 140, according to some example embodiments. The method 600 includes operations 610-630 and may be executed by the configurator machine 112.

In operation 610, the identification module 210 of the configurator machine 112 identifies one receiver machine 142 as being unavailable for inclusion in (e.g., executable from) the primary consumer pool 140. For example, the identification module 210 may determine that a status message from the receiver machine 142 has not been received within a predefined period of time.

In operation 620, the identification module 210 identifies another receiver machine 164 as being available for inclusion in the primary consumer pool 140. In operation 630, the provision module 230 provides the consumer address 310 of the now-unavailable receiver machine 142 to the newly identified receiver machine 164. Operations 620-630 may be performed in a manner similar to operation 430. In identifying a replacement for the receiver machine 142, the identification module 210 may identify a receiver machine that is already in a consumer pool (e.g., receiver machine 144 in the primary consumer pool 140, receiver machine 154 in the backup consumer pool 150, or receiver machine 164 in the weighted consumer pool 160). Alternatively, the replacement may be a receiver machine that has not been allocated to a consumer pool.

Figure 7:
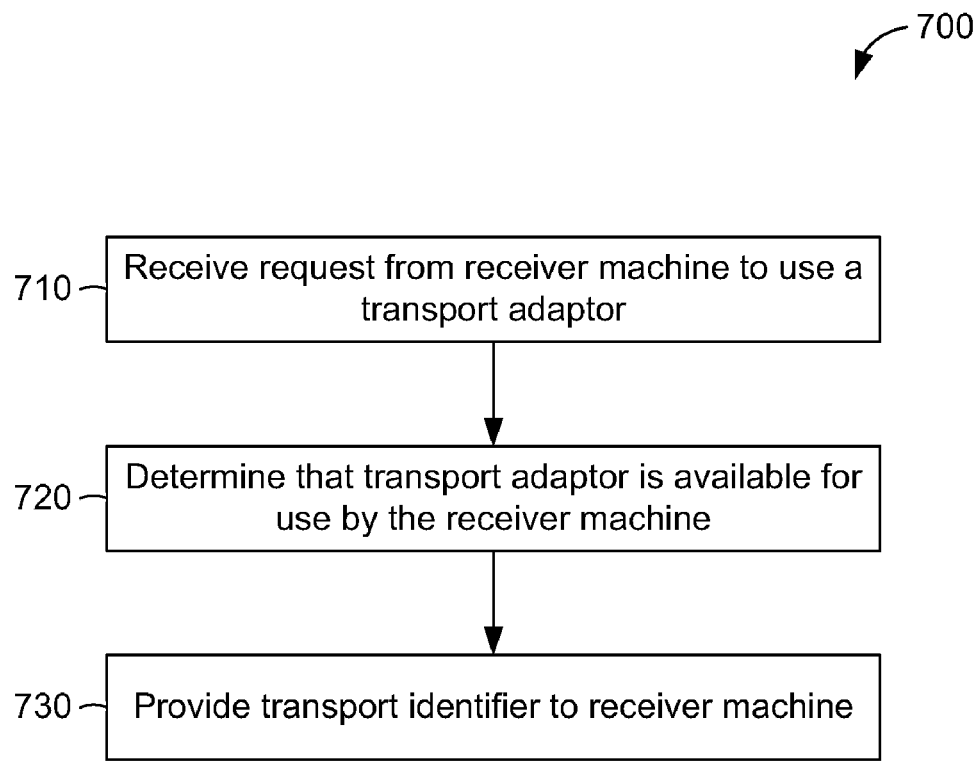
FIG. 7 is a flow chart illustrating operations in a method of allocating a transport adaptor to a receiver machine, according to some example embodiments.

FIG. 7 is a flow chart illustrating operations in method 700 of allocating a transport adaptor to the receiver machine 142, according to some example embodiments. The method includes operations 710-730 and may be executed by the configurator machine 112.

In operation 710, the reception module 240 of the configurator machine 112 receives a request from the receiver machine 142 to use a transport adaptor supported by the topic-based messaging service. In operation 720, the provision module 230 of the configurator machine 112 determines that the transport adaptor is supported and is available for use by the receiver machine 142. In operation 730, the provision module 230 provides the corresponding transport identifier to the receiver machine 142, thus enabling the generation module 330 of the receiver machine 142 to generate the multicast communication based on the transport identifier. For example, the transport identifier may be included in the multicast communication. As noted above, in some example embodiments, the topic corresponds to a particular transport adaptor (e.g., the name of the transport adaptor may be the topic identifier), and the receiver machine 142 implicitly requests use of the particular transport adaptor by subscribing to the topic (e.g., by sending registration data to the configurator machine). In such cases, the configurator machine 112 need not provide an explicit transport identifier, and provision of the consumer address to the receiver machine 142 may inherently authorize the receiver machine 142 to use the particular transport adaptor.

Figure 8:
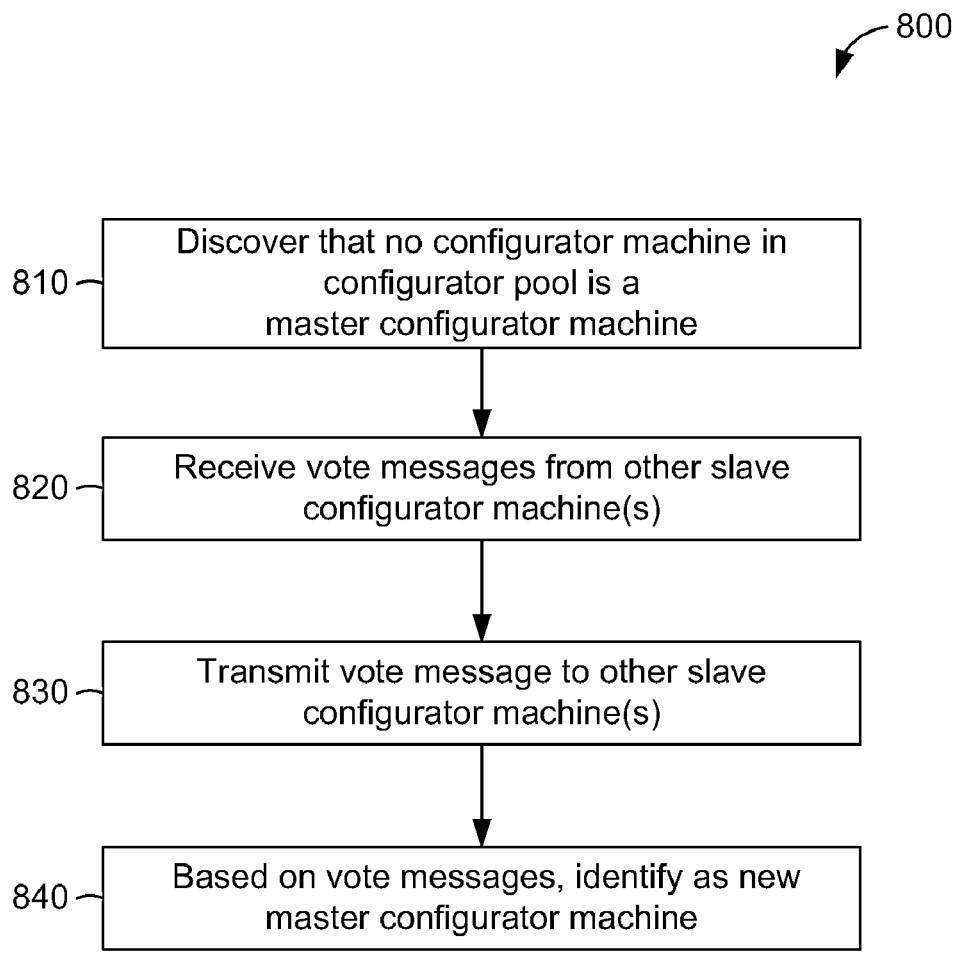
FIG. 8 is a flow chart illustrating operations in a method of determining that a configurator machine is a master configurator machine, according to some example embodiments.

FIG. 8 is a flow chart illustrating operations in method 800 of determining that the configurator machine 112 is a master configurator machine, according to some example embodiments. The method 800 includes operations 810-840 and may be executed by the configurator machine 112, for example, upon starting up (e.g., after a reboot).

In operation 810, the identification module 210 of the configurator machine 112 discovers that no configurator machine in the configurator pool 110 is a master configurator machine. For example, the identification module 210 may determine that no configuration data or consumer addresses (e.g., consumer address 310) has been transmitted via the network 120 (e.g., and received by the reception module 240 of the configurator machine 112) by any master configurator machine within a predefined period of time.

In operation 820, the reception module 240 of the configurator machine 112 receives one or more vote messages from one or more other configurator machines (e.g., functioning as slave configurator machines). For example, each configurator machine may start up as a slave configurator machine and transmit (e.g., multicast) a vote message to all other slave configurator machines. Each vote message indicates a proposed candidate for becoming the master configurator machine in the configurator pool 110. The vote messages may be based on data contained in multicast communications (e.g., multicast advertisement messages) sent via the network 120 from the receiver machines 142-146. For example, the vote messages may contain a network-based identifier of the configurator machine (e.g., configurator machine 112) that was previously functioning as the master configurator machine of the configurator pool 110.

In operation 830, the provision module 230 of the configurator machine 112 transmits a vote message to the other configurator machines. In operation 840, the provision module 230 processes the received vote messages and identifies the configurator machine 112 as the new master configurator machine. This identification as the new master configurator machine may be based on store data indicating that the configurator machine 112 was the most recent master configurator machine for the configurator pool 110, the primary consumer pool 140, the backup consumer pool 150, or any suitable combination thereof. The provision module 230 transmits a status message (e.g., an assertion message) notifying the other configurator machines that the configurator machine 112 is the new master and instructing the other configurator machines to operate as slave configurator machines.

Figure 9:
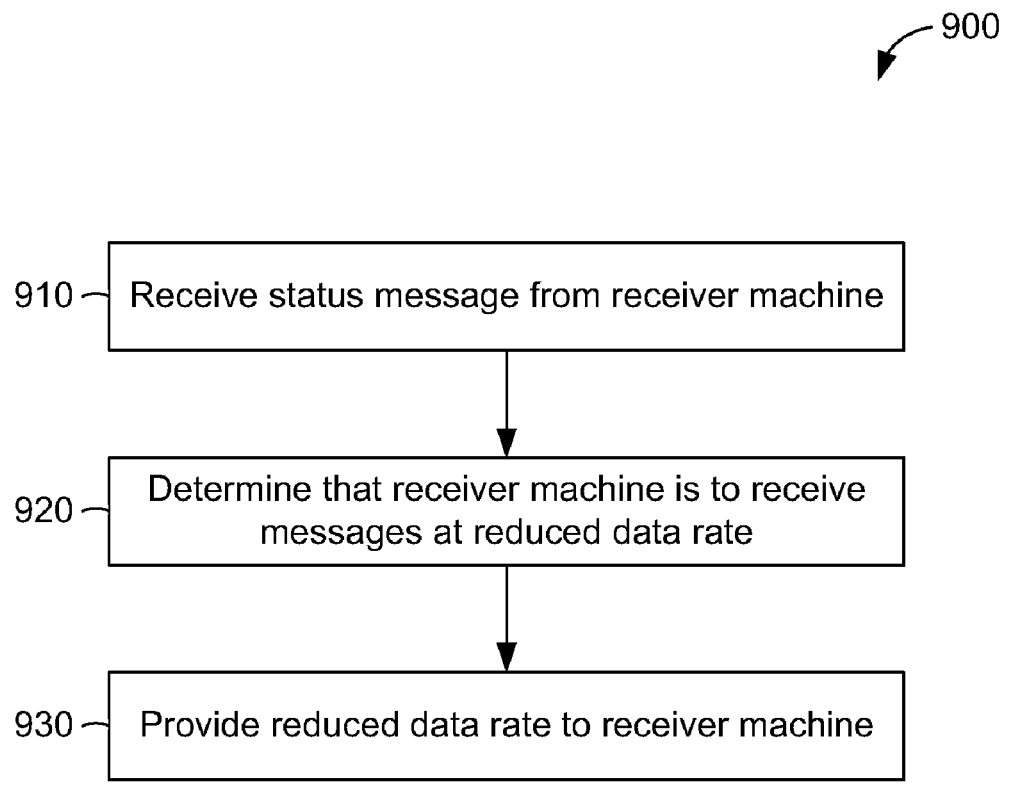
FIG. 9 is a flow chart illustrating operations in a method of configuring a receiver machine to use a reduced data rate, according to some example embodiments.

FIG. 9 is a flow chart illustrating operations in method 900 of configuring a receiver machine (e.g., receiver machine 164) to use a reduced data rate, according to some example embodiments. The method 900 includes operations 910-930 and may be executed by the configurator machine 112.

In operation 910, the reception module 240 of the configurator machine 112 receives a status message from the receiver machine 164 in the weighted consumer pool 160. As noted above, the status message may indicate an incipient problem (e.g., transgression of a buffer threshold) on the receiver machine 164.

Based on the received status message, in operation 920, the provision module 230 of the configurator machine 112 determines that the receiver machine 164 is to receive messages at a reduced data rate. In operation 930, the provision module 230 provides the reduced data rate to the receiver machine 164. In some example embodiments, the status message includes a request for a particular data rate to use as the reduced data rate. In alternative example embodiments, the status message includes a request for a predefined incremental reduction in data rate.

According to various example embodiments, one or more of the methodologies described herein may facilitate a flexible and scalable topic-based messaging service. As noted above, the messaging service managed by the configurator machine 112 enables expansion and contraction of the primary consumer pool 140 by addition and removal of receiver machines (e.g., receiver machine 142). Moreover, the messaging service enables point-to-point communication within a multicast publisher-subscriber environment, where a transmitter machine (e.g., a publisher machine) may direct a message to the consumer address 310 in the primary consumer pool 140 without any identifying information (e.g., a network-based identifier) that is specific to a subscriber machine (e.g., receiver machine 142). Accordingly, one or more of the methodologies discussed herein may obviate a need for concurrent operation of multiple messaging services, which may have the technical effect of reducing computing resources used by one or more devices within the system 100. Examples of such computing resources include, without limitation, processor cycles, network traffic, memory usage, storage space, and power consumption.

Figure 10:
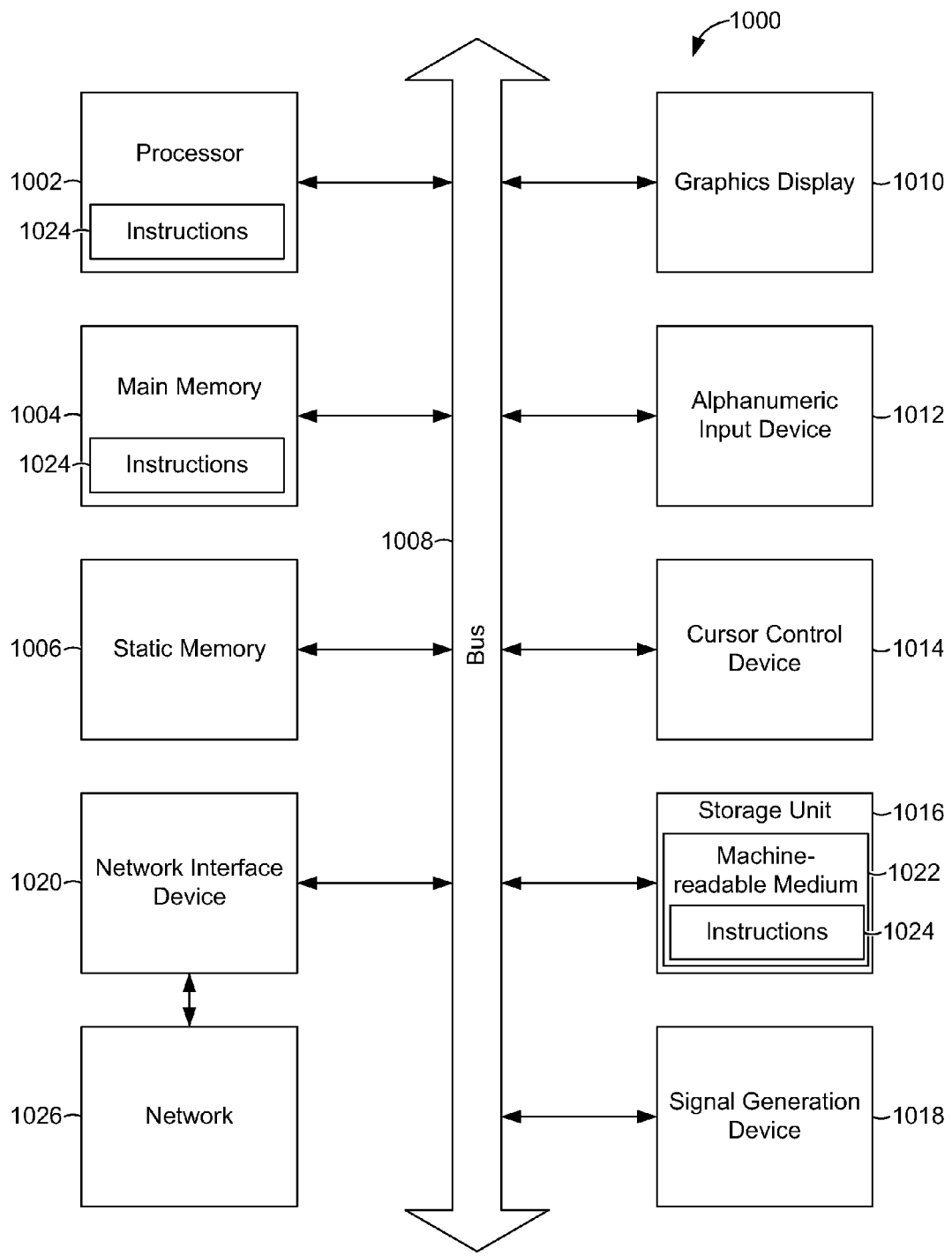
FIG. 10 is a block diagram illustrating components of a machine, according to some example embodiments, able to read instructions from a machine-readable storage medium and perform any one or more of the methodologies discussed herein.

FIG. 10 illustrates components of a machine 1000, according to some example embodiments, that is able to read instructions from a machine-readable medium (e.g., machine-readable storage medium) and perform any one or more of the methodologies discussed herein. Specifically, FIG. 10 shows a diagrammatic representation of the machine 1000 in the example form of a computer system and within which instructions 1024 (e.g., software) for causing the machine 1000 to perform any one or more of the methodologies discussed herein may be executed. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024 (sequentially or otherwise) that specify actions to be taken by that machine. Further, while only a single machine is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 (e.g., software) embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 (e.g., network 120) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., software) for execution by the machine, such that the instructions, when executed by one or more processors of the machine (e.g., processor 1002), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
identifying a receiver machine as available for inclusion in a consumer pool of receiver machines, the consumer pool comprising a plurality of receiver machines to receive messages that correspond to a topic, at least one of the messages being transmitted from a transmitter machine communicatively coupled to the receiver machine and to each of the plurality of receiver machines via a network;
generating a consumer address of the receiver machine with respect to the consumer pool, the consumer address being unique to the receiver machine within the consumer pool, the generating being based on registration data received from the receiver machine and being performed by a module implemented using a processor of a configurator machine; and
providing the consumer address to the receiver machine, the consumer address being usable by the receiver machine to generate a multicast communication based on the consumer address, the multicast communication indicating that the receiver machine is available to receive at least some of the messages that correspond to the topic.

2. The computer-implemented method of claim 1, wherein:
the topic is a root topic;
the consumer pool corresponds to the root topic;
the messages correspond to the root topic and to a subtopic of the root topic;
the messages indicate occurrences of events pertinent to the subtopic;
the at least some of the messages include a message that corresponds to the consumer address of the receiver machine; and
the message that corresponds to the consumer address includes a hash generated based on the consumer address.

3. The computer-implemented method of claim 1, further comprising:
receiving the registration data from the receiver machine, the registration data indicating that the receiver machine is available to receive at least some of the messages that correspond to the topic; and
receiving publication data from the transmitter machine, the publication data including a topic identifier that indicates the topic, the publication data indicating that the transmitter machine is to transmit the at least one of the messages that correspond to the topic.

4. The computer-implemented method of claim 1 further comprising:
providing configuration data to the receiver machine, the configuration data including a network-based identifier of the receiver machine, and wherein:
the configuration data is usable by the receiver machine to generate the multicast communication based on the configuration data.

5. The computer-implemented method of claim 1 further comprising:
storing pool data corresponding to the consumer pool, the pool data referencing each of the plurality of receiver machines; and
updating the pool data by including a reference to the receiver machine and the consumer address of the receiver machine in the pool data.

6. The computer-implemented method of claim 1, wherein:
the receiver machine is a first receiver machine; and the method further comprises:
identifying the first receiver machine as unavailable for inclusion in the consumer pool;
identifying a second receiver machine as available for inclusion in the consumer pool; and
providing the consumer address of the first receiver machine to the second receiver machine.

7. The computer-implemented method of claim 1, wherein:
each of the messages includes a transport identifier that identifies a transport adaptor to facilitate message reception; and the method further comprises:
receiving a request to use the transport adaptor from the receiver machine; and
providing the transport identifier to the receiver machine to enable the receiver machine to include the transport identifier in the multicast communication.

8. The computer-implemented method of claim 7, wherein the transport adaptor is to use at least one of:
a multicast protocol;
User Datagram Protocol (UDP);
a negative-acknowledge protocol (NAK); or
Transmission Control Protocol (TCP).

9. The computer-implemented method of claim 1, wherein:
the configurator machine is a first configurator machine; and the method further comprises:
identifying the first configurator machine as a master machine to provide the consumer address and update a slave machine; and
identifying a second configurator machine as the slave machine to not provide the consumer address and be updated by the first configurator machine.

10. The computer-implemented method of claim 1 further comprising:
determining that the receiver machine is to receive at least some of the messages that correspond to the topic at a reduced data rate less than a maximum data rate of at least one of the plurality of receiver machines; and
providing the reduced data rate to the receiver machine, the reduced data rate being usable by the receiver machine in generating the multicast communication.

11. A computer-implemented method comprising:
receiving a consumer address of a receiver machine from a configurator machine, the consumer address being unique to the receiver machine within a consumer pool of receiver machines, the consumer pool comprising a plurality of receiver machines to receive messages that correspond to a topic, the consumer address being generated by the configurator machine based on registration data transmitted by the receiver machine, the registration data indicating that the receiver machine is available to receive at least some of the messages that correspond to the topic, at least one of the messages being transmitted by a transmitter machine communicatively coupled to the receiver machine via a network;
generating a multicast communication based on the consumer address, the multicast communication indicating an availability of the receiver machine to receive at least some of the messages that correspond to the topic, the generating being performed by a module implemented using a processor of the receiver machine;
transmitting the multicast communication via the network; and
receiving the at least one of the messages that correspond to the topic from the transmitter machine, the at least one of the messages including a message that corresponds to the consumer address of the receiver machine.

12. The computer-implemented method of claim 11, wherein:
the topic is a root topic;
the consumer pool corresponds to the root topic;
the messages correspond to the root topic and to a subtopic of the root topic;
the messages indicate occurrences of events pertinent to the subtopic;
the message that corresponds to the consumer address includes a hash generated based on the consumer address; and the method further comprises:
transmitting the registration data to the configurator machine, the registration data including a topic identifier that identifies the root topic.

13. The computer-implemented method of claim 11 further comprising:
receiving configuration data from the configurator machine, the configuration data including a network-based identifier of the receiver machine; and wherein:
the generating of the multicast communication is based on the configuration data.

14. The computer-implemented method of claim 13, wherein
the multicast communication includes the network-based identifier and indicates that the receiver machine is available for point-to-point communication.

15. The computer-implemented method of claim 14, wherein:
the multicast communication is a first communication; and the method further comprises:
transmitting a second communication via the network, the second communication including a request to pause reception of the messages that correspond to the topic.

16. The computer-implemented method of claim 15 further comprising
transmitting a third communication via the network, the third communication including a request to resume reception of the messages that correspond to the topic.

17. A system comprising:
an identification module to identify a receiver machine as available for inclusion in a consumer pool of receiver machines, the consumer pool comprising a plurality of receiver machines to receive messages that correspond to a topic, at least one of the messages being transmitted from a transmitter machine communicatively coupled to the receiver machine and to each of the plurality of receiver machines via a network;
a hardware-implemented generation module to generate a consumer address of the receiver machine with respect to the consumer pool, the consumer address being unique to the receiver machine within the consumer pool, the generating being based on registration data received from the receiver machine; and
a provision module to provide the consumer address to the receiver machine, the consumer address being usable by the receiver machine to generate a multicast communication based on the consumer address, the multicast communication indicating that the receiver machine is available to receive at least some of the messages that correspond to the topic.

18. A system comprising:
a reception module to:
receive a consumer address of a receiver machine from a configurator machine, the consumer address being unique to the receiver machine within a consumer pool of receiver machines, the consumer pool comprising a plurality of receiver machines to receive messages that correspond to a topic, the consumer address being generated by the configurator machine based on registration data transmitted by the receiver machine, the registration data indicating that the receiver machine is available to receive at least some of the messages that correspond to the topic, at least one of the messages being transmitted by a transmitter machine communicatively coupled to the receiver machine via a network; and
receive the at least one of the messages that correspond to the topic from the transmitter machine, the at least one of the messages including a message that corresponds to the consumer address of the receiver machine;
a hardware-implemented generation module to generate a multicast communication based on the consumer address, the multicast communication indicating an availability of the receiver machine to receive at least some of the messages that correspond to the topic; and
a transmission module to transmit the multicast communication via the network.

19. A non-transitory machine-readable storage medium comprising instructions that, when executed by one or more processors of a machine, cause the machine to perform operations comprising:
identifying a receiver machine as available for inclusion in a consumer pool of receiver machines, the consumer pool comprising a plurality of receiver machines to receive messages that correspond to a topic, at least one of the messages being transmitted from a transmitter machine communicatively coupled to the receiver machine and to each of the plurality of receiver machines via a network;
generating a consumer address of the receiver machine with respect to the consumer pool, the consumer address being unique to the receiver machine within the consumer pool, the generating being based on registration data received from the receiver machine; and
providing the consumer address to the receiver machine, the consumer address being usable by the receiver machine to generate a multicast communication based on the consumer address, the multicast communication indicating that the receiver machine is available to receive at least some of the messages that correspond to the topic.

20. A non-transitory machine-readable storage medium comprising instructions that, when executed by one or more processors of a machine, cause the machine to perform operations comprising:
receiving a consumer address of a receiver machine from a configurator machine, the consumer address being unique to the receiver machine within a consumer pool of receiver machines, the consumer pool comprising a plurality of receiver machines to receive messages that correspond to a topic, the consumer address being generated by the configurator machine based on registration data transmitted by the receiver machine, the registration data indicating that the receiver machine is available to receive at least some of the messages that correspond to the topic, at least one of the messages being transmitted by a transmitter machine communicatively coupled to the receiver machine via a network;
generating a multicast communication based on the consumer address, the multicast communication indicating an availability of the receiver machine to receive at least some of the messages that correspond to the topic;
transmitting the multicast communication via the network; and
receiving the at least one of the messages that correspond to the topic from the transmitter machine, the at least one of the messages including a message that corresponds to the consumer address of the receiver machine.

* * * * *

UNITED STATES PATENT AND TRADEMARK OFFICE
CERTIFICATE OF CORRECTION

| | | |
|---|---|---|
| PATENT NO. | : 8,380,799 B2 | Page 1 of 1 |
| APPLICATION NO. | : 12/761248 | |
| DATED | : February 19, 2013 | |
| INVENTOR(S) | : Murthy et al. | |

It is certified that error appears in the above-identified patent and that said Letters Patent is hereby corrected as shown below:

On the title page, in column 2, under "Item (56) Other Publications", line 12, after "pgs.", insert --"--, therefor On the title page, in column 2, under "Item (57) Abstract", line 14, after "in", delete "to", therefor In the Specification:

In column 8, line 44, delete "140" and insert --142--, therefor

In column 8, line 52, delete "240" and insert --340--, therefor

In column 10, line 1, delete "220" and insert --320--, therefor

In column 10, line 59, delete "executable" and insert --excludable--, therefor

In the Claims:

In column 18, line 52, in Claim 14, after "wherein", insert --:--, therefor

In column 18, line 64, in Claim 16, after "comprising", insert --:--, therefor

Signed and Sealed this
Thirty-first Day of December, 2013

Margaret A. Focarino
*Commissioner for Patents of the United States Patent and Trademark Office*